United States Patent
Helvaci

(10) Patent No.: US 9,234,433 B2
(45) Date of Patent: Jan. 12, 2016

(54) FLAP SEAL SPRING AND SEALING APPARATUS

(75) Inventor: Caner H. Helvaci, Derby (GB)

(73) Assignee: ROLLS-ROYCE PLC, London (GB)

(*) Notice: Subject to any disclaimer, the term of this patent is extended or adjusted under 35 U.S.C. 154(b) by 782 days.

(21) Appl. No.: 13/472,996

(22) Filed: May 16, 2012

(65) Prior Publication Data

US 2012/0308368 A1 Dec. 6, 2012

(30) Foreign Application Priority Data

Jun. 1, 2011 (GB) .................................. 1109143.6

(51) Int. Cl.
*F01D 11/00* (2006.01)
*F16J 15/08* (2006.01)

(52) U.S. Cl.
CPC .............. *F01D 11/005* (2013.01); *F01D 11/00* (2013.01); *F16J 15/0887* (2013.01); *Y10T 29/49826* (2015.01)

(58) Field of Classification Search
CPC ....... F01D 25/14; F01D 25/24; F01D 25/243; F01D 25/246; F01D 25/26; F01D 25/265; F01D 11/02; F01D 11/08; F01D 11/00; F05D 2240/11; F05D 2240/14; F05D 2240/57; F05D 2260/30
USPC ........... 415/134, 135, 138, 139, 168.1, 168.4, 415/170.1, 173.1, 173.2, 173.3, 174.1, 415/174.2, 213.1, 214.1
See application file for complete search history.

(56) References Cited

U.S. PATENT DOCUMENTS

| | | | | | |
|---|---|---|---|---|---|
| 1,783,427 | A | * | 12/1930 | Jennings | 277/581 |
| 3,972,475 | A | * | 8/1976 | Nelson et al. | 239/127.3 |
| 4,171,093 | A | * | 10/1979 | Honeycutt et al. | 239/127.3 |
| 4,576,548 | A | * | 3/1986 | Smed et al. | 415/137 |
| 5,099,886 | A | * | 3/1992 | Squirrell | 137/856 |
| 5,118,120 | A | | 6/1992 | Drerup et al. | |
| 5,337,583 | A | * | 8/1994 | Giles et al. | 60/752 |
| 5,601,402 | A | * | 2/1997 | Wakeman et al. | 415/173.2 |
| 5,797,723 | A | * | 8/1998 | Frost et al. | 415/174.2 |

(Continued)

FOREIGN PATENT DOCUMENTS

EP 1 445 537 A2 8/2004
WO WO 2010/027384 A1 3/2010

OTHER PUBLICATIONS

Sep. 28, 2011 British Search Report issued in British Patent Application No. GB1109143.6.

*Primary Examiner* — Craig Kim
*Assistant Examiner* — Wayne A Lambert
(74) *Attorney, Agent, or Firm* — Oliff PLC

(57) ABSTRACT

A biasing means is provided for securing a plurality of sealing components which are arranged to seal gaps between adjacent structural components in a turbine, the biasing means having three foot regions joined in a substantially linear fashion by two resilient curved arms, wherein each arm has securing means for securing the biasing means to one of said structural components such that when the biasing means is secured to said one of said structural components, each of said foot regions contacts one of said sealing components and the curved arms urge the sealing components towards one of said structural components so that the sealing components collectively create a seal over the gap between said structural components. An apparatus for sealing gaps between adjacent structural components which includes the biasing means is also provided as is a method of sealing gaps in a turbine.

18 Claims, 5 Drawing Sheets

(56) References Cited

U.S. PATENT DOCUMENTS

| | | | |
|---|---|---|---|
| 5,871,333 A * | 2/1999 | Halsey | 415/173.1 |
| 6,203,025 B1 * | 3/2001 | Hayton | 277/644 |
| 6,315,301 B1 * | 11/2001 | Umemura et al. | 277/545 |
| 6,431,555 B1 * | 8/2002 | Schroder et al. | 277/628 |
| 6,464,232 B1 * | 10/2002 | Marchi et al. | 277/630 |
| 6,464,457 B1 * | 10/2002 | Morgan et al. | 415/174.2 |
| 6,652,229 B2 * | 11/2003 | Lu | 415/190 |
| 6,682,300 B2 * | 1/2004 | Bolms | 415/173.3 |
| 6,733,234 B2 * | 5/2004 | Paprotna et al. | 415/138 |
| 7,073,336 B2 * | 7/2006 | Lepretre et al. | 60/751 |
| 7,788,932 B2 * | 9/2010 | Kunitake et al. | 60/797 |
| 2002/0108378 A1 * | 8/2002 | Ariyoshi et al. | 60/800 |
| 2004/0051254 A1 * | 3/2004 | Smed | 277/628 |
| 2004/0239050 A1 * | 12/2004 | Antunes et al. | 277/630 |
| 2008/0080968 A1 | 4/2008 | Guentert et al. | |
| 2010/0071208 A1 | 3/2010 | Durocher et al. | |
| 2011/0304104 A1 * | 12/2011 | McMahan et al. | 277/637 |

\* cited by examiner

Side View

Isometric View

PRIOR ART

FLAP SEAL SPRING AND SEALING APPARATUS

The present invention relates to flap seal springs which are preferably, but not exclusively used for securing sealing components in a turbine and a sealing apparatus including such springs.

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle1 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Leakage in gas turbines is a significant source of inefficiency and flap seals are regularly used to provide a fluid seal between adjacent components of the turbine wall. FIG. 2 shows the use of a single primary plate 1 to provide a fluid seal between adjacent components 2, 4. However a single plate arrangement such as that shown in FIG. 2 results in gaps 3 needing to be left between the plates 1 to allow for movement and/or thermal expansion. These gaps can result in significant leakage.

A known way of overcoming this leakage is shown in FIG. 3, and uses overlap plates 5 (secondary plates) which cover the gaps between the primary plates 1. Often springs are used in conjunction with this type of seal in order to load the primary plate 1 against the adjacent components 2 and 4.

U.S. Pat. No. 5,118,120 describes a leaf spring arrangement which applies pressure to the centre of the primary plate as shown in FIG. 4 of that document. The problem with this design is that the overlap plate is not sprung and so the arrangement relies on the overpressure within the device to close any crescent gap created due to an axial mismatch between the inner and outer components as described below. Although this arrangement may be effective in some devices, in others the pressure differential may only be a few percent and so gaps will occur. The overlap plate is also lacking any damping and could suffer from vibration problems.

Crescent leakage gaps result from axial misalignment or movement of the two adjacent components 2, 4 as shown in FIG. 4 which shows a cross-sectional and isometric view of a seal created by a primary plate 1 between adjacent components 2, 4 between which an axial misalignment 52 has resulted. As shown in FIG. 4, crescent shaped gaps 51 arise at the centre of the primary plate 1 due to this misalignment.

Furthermore, in U.S. Pat. No. 5,118,120, high stresses are likely to be generated around the holes at the ends of the spring, due to the stress concentration effect of the holes.

Therefore it is desirable to achieve the best possible seal when overlap plates are used as flap seals and in similar arrangements. It is also desirable to improve the longevity of such seals in order to maximise the time between required maintenance or replacement.

According, at its broadest, a first aspect of the present invention provides a biasing means which secures both primary and secondary plates to seal the gap between structural components of a turbine more effectively, preferably completely.

A first aspect of the present invention preferably provides a biasing means for securing a plurality of sealing components which are arranged to seal gaps between adjacent structural components in a turbine, the biasing means comprising three foot regions joined in a linear or substantially linear fashion by two resilient curved arms, wherein each arm comprises securing means for securing the biasing means to one of said structural components such that when the biasing means is secured to said one of said structural components, each of said foot regions contacts one of said sealing components and the curved arms urge the sealing components towards one of said structural components so that the sealing components collectively create a seal over the gap between said structural components.

The design of the biasing means (or spring) provides loading at three positions which preferably ensures that the sealing components (such as a primary plate and secondary/overlap plate as described above) are in contact with the inner and outer structural components at all engine conditions, thereby reducing leakage and improving efficiency.

The curved arms of the biasing means may have any form of curved profile but are preferably substantially or wholly arcuate. The arms may also have one or more linear sections or "flats", and indeed could be made entirely of such linear sections without any intermediate curved sections.

The curved arms are preferably curved such that the profile of each arm is positioned on the same side of the biasing means. The arms are preferably symmetrical about a centre point of the biasing means.

The loading from the spring preferably also provides a damping effect on the sealing components (both the primary and secondary/overlap plates) which has the effect of reducing wear on the sealing plates and improving the durability of the seal. The front profile of the spring is preferably designed to maintain an even stress distribution.

Preferably each securing means is a hole through which a pin can be inserted to secure the biasing means. Such securing fixes the lateral position of the biasing means relative to the structural components.

In one arrangement, each arm has a linear section and the securing means are located in that linear section. This arrangement may reduce the complexity of creating the securing means and the concentration of stresses around the securing means.

In particular embodiments of the present aspect, the holes are circular and the biasing means further comprises stress reduction means which reduce the stress concentration around each of said holes. These stress reduction means may comprise further holes which are configured to reduce said stress concentration, in particular triangular, or substantially triangular holes where two sides of the triangular holes run substantially parallel to the edges of the biasing means and the third side of the triangular hole is adjacent the securing hole and parallel to a tangent to the hole at the point closest to that side of the triangular hole.

The stress reduction means are preferably arranged to distribute stress evenly throughout the biasing means. The provision of the stress reduction means improves the operational life of the biasing means, and therefore increases the interval between replacements.

At its broadest a second aspect of the present invention provides an apparatus for sealing a gap between two structural components of a turbine which includes a plurality of sealing components and a biasing means for securing those components to seal the gap more effectively, preferably completely.

A second aspect of the present invention preferably provides an apparatus for sealing a gap between two structural components of a turbine, the apparatus including a plurality of primary sealing components, a plurality of secondary sealing components and a biasing means for securing said sealing components to the structural components. The biasing means is a biasing means according to the above first aspect and may include some, all or none of the optional or preferred features of that aspect.

The apparatus according to the second aspect provides the components which, in combination, can be arranged to securely seal the gap between the structural components. Preferably the apparatus includes as many primary sealing components as are necessary to seal the entire gap between the structural components whilst allowing for sufficient movement and/or expansion of those primary sealing components and a secondary sealing component to seal each of the gaps between those primary sealing components, and one biasing means per primary sealing component.

Preferably the apparatus is arranged, in use, to seal said gap by: the primary sealing components being arranged to seal the majority of said gap with gaps being present between each pair of primary sealing components to allow for expansion or movement of said primary sealing components; each secondary sealing component sealing a gap between a pair of primary sealing components; a first primary sealing component being urged into contact with one of said structural components by the biasing means; and at least one secondary sealing component being urged into contact with said first primary sealing component by the biasing means.

Preferably the foot regions of the biasing means comprise a central foot region and two end foot regions each joined to said central foot region by a respective one of said arms, and further wherein, in use, the first primary sealing component is urged into contact with said structural component by the central foot region of the biasing means and a secondary sealing component is urged into contact with said first primary sealing component by one of said end foot regions.

This arrangement allows the biasing means to secure a primary sealing component at the central foot region and two secondary sealing components at either end of the primary sealing component which seal the gaps between that primary sealing component and adjacent primary sealing components.

At its broadest a third aspect of the present invention provides turbine having a plurality of structural components which have a gap between them, wherein the gap is sealed by a plurality of sealing components and a biasing means which secures those components to seal the gap more effectively, preferably completely.

A third aspect of the present invention preferably provides a turbine having a plurality of structural components with a gap between said structural components, wherein the gap is sealed by a plurality of sealing components, the sealing components comprising a plurality of primary sealing components, a plurality of secondary sealing components and a biasing means for securing said sealing components to the structural components, the biasing means being a biasing means according to the above first aspect, wherein: the primary sealing components seal the majority of said gap with gaps being present between each pair of primary sealing components to allow for expansion or movement of said primary sealing components; each secondary sealing component seals a gap between a pair of primary sealing components; a first primary sealing component is urged into contact with one of said structural components by the biasing means; and at least one secondary sealing component is urged into contact with said first primary sealing component by the biasing means.

The biasing means used in the above third aspect may include some, all or none of the optional or preferred features of the above first aspect.

Preferably the foot regions of the biasing means comprise a central foot region and two end foot regions each joined to said central foot region by a respective one of said arms, and further wherein the first primary sealing component is urged into contact with said structural component by the central foot region of the biasing means and a secondary sealing component is urged into contact with said first primary sealing component by one of said end foot regions.

This arrangement allows the biasing means to secure a primary sealing component at the central foot region and two secondary sealing components at either end of the primary sealing component which seal the gaps between that primary sealing component and adjacent primary sealing components.

A fourth aspect of the present invention preferably provides a method of sealing a gap between two structural components in a turbine, the method including the steps of: sealing the majority of said gap with a plurality of primary sealing components with gaps being left between each pair of primary sealing components to allow for expansion or movement of said primary sealing components; sealing each gap between said plurality of primary sealing components with a secondary sealing component; securing a first primary sealing component by urging it into contact with one of said structural components using a biasing means; and securing at least one secondary sealing component by urging it into contact with said first primary sealing component using the same biasing means.

Preferably the biasing means used in the method of this aspect is a biasing means according to the above first aspect and may include some, all or none of the optional or preferred features of that aspect.

Embodiments of the invention will now be described by way of example with reference to the accompanying drawings in which.

Figure 1:
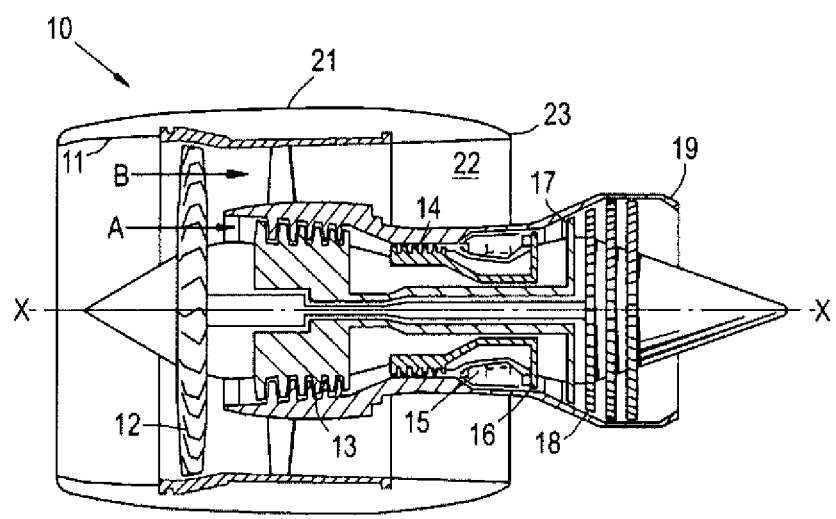
FIG. 1 shows a schematic longitudinal cross-section through a ducted fan gas turbine engine and has already been described.
Figure 2:
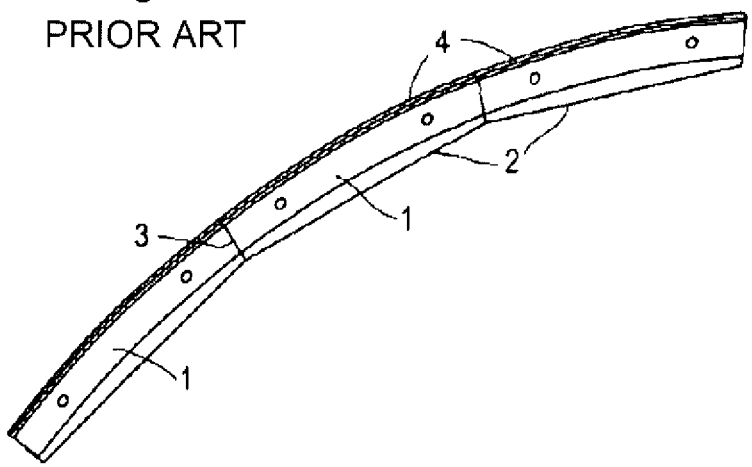
FIG. 2 shows a known rudimentary fluid seal using a plate and has already been described.
Figure 3:
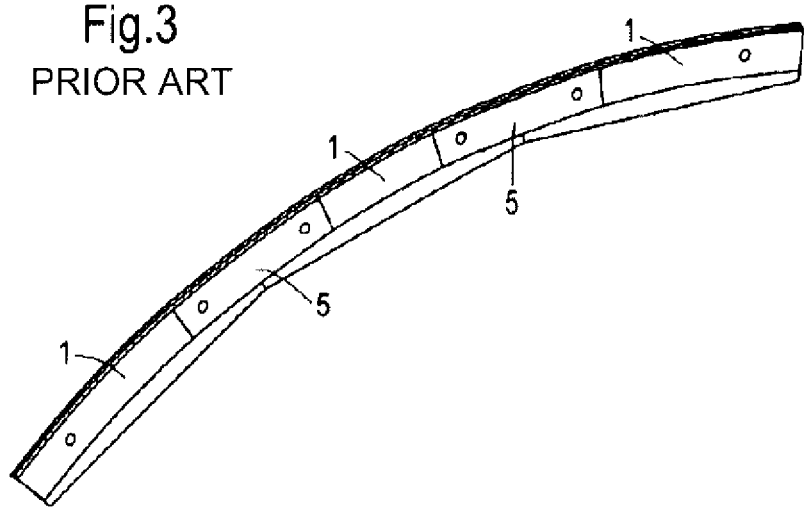
FIG. 3 shows a known development of the fluid seal shown in FIG. 2 using overlap plates and has already been described.
Figure 4:
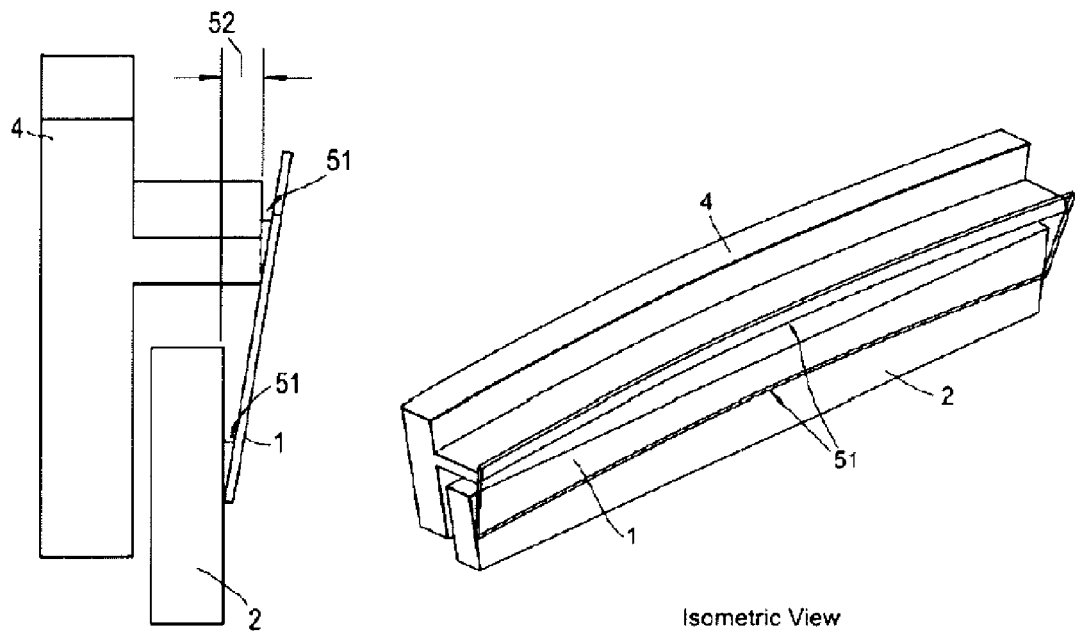
FIG. 4 shows an arrangement of an existing fluid seal and the gaps that may result from axial misalignment of the associated components and has already been described.
Figure 5:
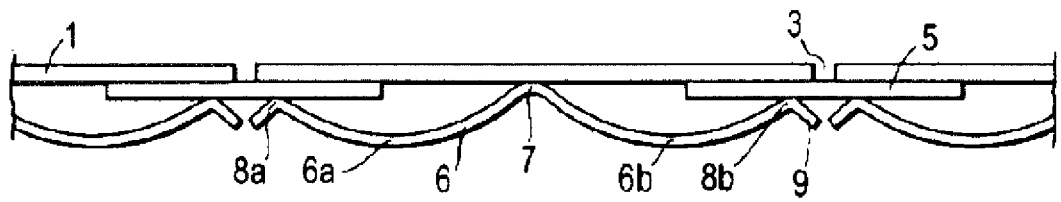
FIG. 5 shows a schematic top view of a flap seal spring according to an embodiment of the present invention in sealing position.

FIG. 5 shows a schematic top view of a flap seal spring 6 according to an embodiment of the present invention. The flap seal spring 6 is shown in conjunction with the other sealing components 1, 5 which use the same reference numbers as in the previous Figures. For clarity, FIG. 5 does not show the principal turbine components which the sealing components are intended to seal the gaps between. The flap seal spring 6 and the other sealing components 1, 5 are, in general metal plates. In a preferred embodiment, the sealing components are made from alloy C263 (specification AMS 5872) which is an age-hardenable nickel-cobalt-chromium-molybdenum alloy. This material is commonly used in turbine applications and was chosen for its high operating temperature capability and good minimum proof stress at high temperatures (which allows spring load to be maintained in the operating conditions). Another factor which may influence the choice of material for the sealing components is good creep properties.

The flap seal spring 6 is a resilient plate having three foot regions which are a central foot region 7 and two end foot regions 8a & 8b. Each end foot region 8a, 8b is joined to the central foot region 7 by an arcuate arm 6a, 6b (respectively). The arms 6a, 6b are resiliently biased so as to decrease the radius of curvature of the arms 6a, 6b, thereby urging the foot regions in an upward direction when oriented as shown in FIG. 5.

The flap seal spring 6 is accordingly arranged to contact the sealing components in three positions: one contact with the primary plate 1 at the central foot region 7 and two contacts with the overlapping secondary plates 5 at the end foot regions 8a, 8b. When secured in place (as described below), the resilient biasing of the flap seal spring 6 causes the central foot region 7 to urge the primary plate in an upward direction when oriented as shown in FIG. 5 into contact with the principal turbine components. The resilient biasing also urges the end foot regions 8a, 8b and therefore the secondary plates 5 in the same direction and thereby into contact with the primary plate 1.

The overall result is that the flap seal spring 6 causes the secondary plates 5 to securely seal the gaps 3 between the primary plates 1.

As shown in FIG. 5, by repeating the pattern of components (primary plates 1, secondary plates 5 and flap seal springs 6) along (or around) the join between the principal components, a complete seal can be obtained. In the arrangement shown in FIG. 5, each secondary plate 5 is biased towards a gap 3 and secured in place by two adjacent flap seal springs 6. A small gap may be left between the ends 9 of the flap seal springs 6 in order to accommodate movement of the flap seal springs 6 due to vibration, thermal expansion and/or build tolerances.

The concentrated force from the two flap seal springs acting on each secondary plate closes any gap created due to axial mismatch between the principal components of the turbine.

FIG. 5 also shows all the sealing components arranged in a linear fashion. In many embodiments the principal turbine components between which a seal is required will in fact be arranged in a circumferential fashion and so the primary and secondary sealing plates 1 & 5 will in fact be arcuate in shape when viewed from this perspective.

Each flap seal spring 6 shown in FIG. 5 also has turned up ends 9 which are provided to act as guides to enable the assembly of a plurality of flap seal springs into a ring configuration.

Figure 6:
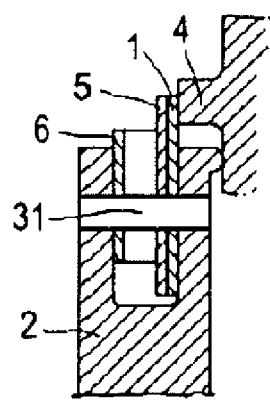
FIG. 6 shows a cross-sectional view of the flap seal spring in the arrangement shown in FIG. 5.

FIG. 6 shows a cross section through the principal turbine components 2, 4 and the sealing components 1, 5, 6 at the point of inflexion of one of the arms 6a of the flap seal spring.

Pin 31 passes through hole 32 (shown in FIG. 7) in the arm 6a of the flap seal spring 6 and through corresponding holes in one of the principal turbine components 2. This secures the flap seal spring 6 in position relative to that component. Primary and secondary sealing plates 1, 5 are urged by the flap seal spring into contact with the other principal turbine component 4 such that the gap between them is sealed and remains sealed even with expansion or movement of the principal components 2, 4 or the sealing plates 1, 5.

Figure 7:
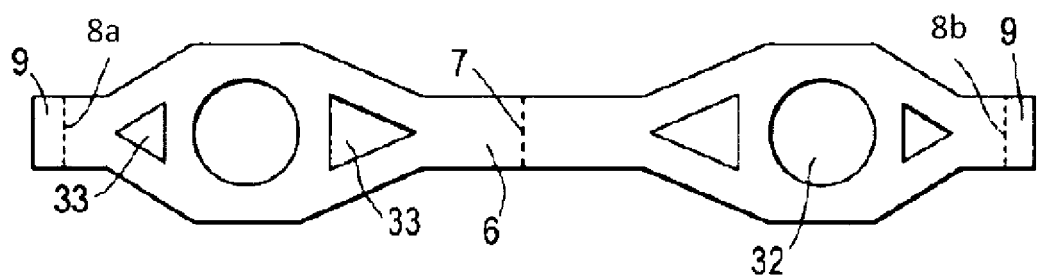
FIG. 7 shows a front view of the flap seal spring shown in FIGS. 5 and 6 in the absence of other components.

FIG. 7 shows the flap seal spring 6 from the front. The flap seal spring 6 has two circular holes 32 which are arranged to accept a pin 31 so that the flap seal spring can be secured to the principal component(s) of the turbine. The holes are approximately centrally located in each of the arms 6a, 6b of the flap seal spring. However, the exact positioning of the holes 32 may be chosen to be in a different position in order to balance the stresses within the flap seal spring 6.

The creation of holes 32 in the otherwise planar form of the flap seal spring 6 results in stress concentration around the holes 32 which would normally be the primary cause of failure of the component. Accordingly, the flap seal spring 6 also has two triangular shaped holes 33 either side of each hole 32 which act as "defender holes" and in combination with the profiled shape of the flap seal spring reduce the stress concentration and distribute the stress evenly through the component.

Figure 8:
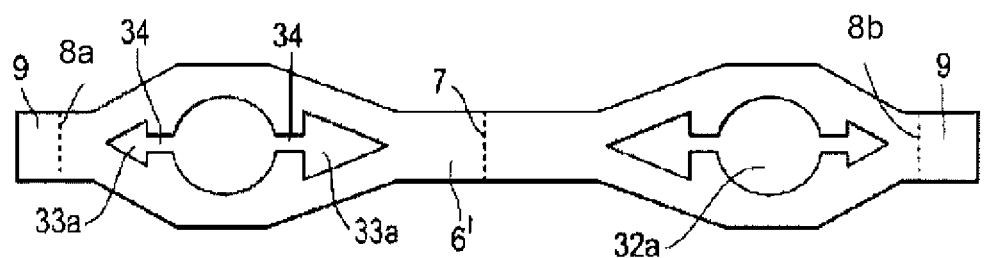
FIG. 8 shows a front view of an alternative embodiment of the flap seal spring.

FIG. 8 shows a front view of an alternative embodiment of a flap seal spring 6'. The flap seal spring is identical to flap seal spring 6 shown in the previous figures, except that the holes 32a and the "defender holes" 33a are configured differently. In this embodiment, the triangular shaped holes 33a are each joined to the adjacent holes 32a by a connector hole 34 such that each arm 6a, 6b has a single, complex hole formed in it. This arrangement may be used to reduce the stress concentration at the point on the holes 32a closest the triangular holes 33a.

Figure 9:
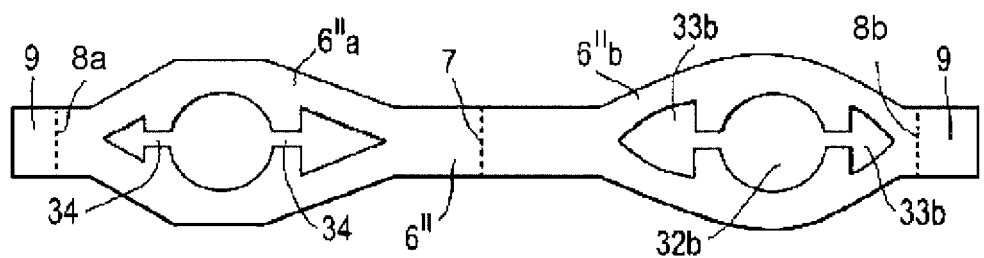
FIG. 9 shows a front view of a further alternative embodiment of the flap seal spring.

FIG. 9 shows a front view of a further alternative embodiment of a flap seal spring 6". The flap seal spring is identical to the flap seal spring 6' shown in FIG. 8, except that the profile of the arm 6"b around the hole 32b has been changed to a curved profile. Similarly, the "defender holes" 33b associated with the hole 32b in the arm 6"b are configured to have curved sides. This arrangement may also be used to reduce the stress concentrations in the arm 6"b and may also be adopted for the other arm 6"a.

It will be appreciated that a variety of further configurations of the "defender holes" 33 and holes 32 may be chosen, depending on the modelling of the stresses in the arms 6a, 6b of the flap seal spring 6 so as to minimise or spread the stress concentration in those arms. Without limitation, this may involve a number of discrete "defender holes" 33 which may or may not be connected to each other or to the hole 32 which allow for the securing of the flap seal spring 6 to the principal components of the turbine.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention. For example, the securing means 32 for securing the biasing means to one of the structural components may be replaced with other securing means as would be apparent to the skilled artisan. The securing means described above could be replaced by a pin integral to the securing means and which is secured to one of the structural components. Alternatively, the securing means described above could be replaced by a sprung arm or slot formation on the structural member behind which the securing means is pressed by or into.

All references referred to above are hereby incorporated by reference.

The invention claimed is:

1. A biasing means for securing a plurality of primary sealing components and secondary sealing components, the primary and secondary sealing components being arranged to seal at least one gap between adjacent structural components in a turbine, the biasing means comprising:
at least three foot regions joined in a substantially linear fashion by two resilient curved arms, each arm including securing means for securing the biasing means to one of primary and secondary sealing components such that: (i) at least two foot regions is in direct contact with at least two respective secondary sealing components, (ii) one foot region is in direct contact with the primary sealing component, and (iii) one of said secondary sealing components and the curved arms urge the primary sealing components towards one of said structural components so that the secondary sealing components form a seal over the at least one gap between said structural components.

2. The biasing means according to claim 1, wherein each securing means corresponds to a hole through which a pin can be inserted to secure the biasing means.

3. The biasing means according to claim 2, wherein the holes are circular and the biasing means further includes stress reduction means configured to reduce a stress concentration around each of said holes.

4. The biasing means according to claim 3, wherein the stress reduction means include further holes which are configured to reduce said stress concentration.

5. An apparatus for sealing a gap between two structural components of a turbine, the apparatus comprising:
a plurality of primary sealing components,
a plurality of secondary sealing components, and
the biasing means according to claim 1 for securing said sealing components to the structural components.

6. The apparatus according to claim 5, wherein the apparatus is arranged, in use, to seal said gap by:
the primary sealing components being arranged to seal the majority of said gap with gaps being present between each pair of primary sealing components to allow for expansion or movement of said primary sealing components;
each secondary sealing component sealing a gap between a pair of primary sealing components;
a first primary sealing component being urged into contact with one of said structural components by the biasing means; and
at least one secondary sealing component being urged into contact with said first primary sealing component by the biasing means.

7. The apparatus according to claim 5, wherein:
the foot regions of the biasing means include a central foot region and two end foot regions each joined to said central foot region by a respective one of said arms, and in use, the first primary sealing component is urged into contact with said structural component by the central foot region of the biasing means and a secondary sealing component is urged into contact with said first primary sealing component by one of said end foot regions.

8. A turbine having a plurality of structural components with a gap between said structural components, the gap being sealed by a plurality of sealing components, the sealing components of the turbine comprising:
a plurality of primary sealing components,
a plurality of secondary sealing components, and
the biasing means according to claim 1 for securing said sealing components to the structural components, wherein:
the primary sealing components seal the majority of said gap with gaps being present between each pair of primary sealing components to allow for expansion or movement of said primary sealing components;
each secondary sealing component seals a gap between a pair of primary sealing components;
a first primary sealing component is urged into contact with one of said structural components by the biasing means; and
at least one secondary sealing component is urged into contact with said first primary sealing component by the biasing means.

9. The turbine according to claim 8, wherein:
the foot regions of the biasing means include a central foot region and two end foot regions each joined to said central foot region by a respective one of said arms, and
the first primary sealing component is urged into contact with said structural component by the central foot region of the biasing means and a secondary sealing component is urged into contact with said first primary sealing component by one of said end foot regions.

10. A method of sealing a gap between two structural components in a turbine, the method including the steps of:
sealing a majority of the gap with a plurality of primary sealing components with gaps being left between each adjacent pair of primary sealing components to allow for expansion or movement of said primary sealing components;
sealing each gap between said plurality of primary sealing components with a secondary sealing component;
securing a first primary sealing component by urging it into contact with one of said structural components with a biasing means; and
securing at least one secondary sealing component by urging it into contact with said first primary sealing component with the biasing means, wherein
the biasing means includes at least three foot regions joined in a substantially linear fashion by two resilient curved arms, each arm includes securing means for securing the biasing means to one of primary and secondary sealing components such that: (i) at least two foot regions is in direct contact with at least two respective secondary sealing components, and (ii) one foot region is in direct contact with the primary sealing component.

11. The method according to claim 10, the curved arms urge the secondary sealing components towards one of the primary sealing components so that the sealing components collectively create a seal over the gap between said structural components.

12. The method according to claim 10, wherein each securing means corresponds to a hole through which a pin can be inserted to secure the biasing means.

13. A flap seal spring for securing a plurality of sealing components arranged to seal at least one gap between adjacent structural components in a turbine, the flap seal spring comprising:
   at least two resilient curved arms, each arm including at least one hole through which a pin is inserted; and
   three foot regions joined in a substantially linear fashion by the at least two resilient curved arms such that when the flap seal spring is secured to one of the structural components, each of the foot regions contacts one of the sealing components and the curved arms urges the sealing components towards one of the structural components so that the sealing components collectively form a seal over the at least one gap between the structural components.

14. The flap seal spring according to claim 13, wherein the at least one hole is circular.

15. The flap seal spring according to claim 13, further comprising:
   at least one triangular shaped hole configured to reduce a stress concentration around the at least one hole.

16. The flap seal spring according to claim 15, further comprising:
   at least one connector hole linking the at least one triangular shaped hole to the at least one hole.

17. The flap seal spring according to claim 15, wherein at least one side of the at least one triangular shaped hole is curved.

18. The flap seal spring according to claim 13, wherein an arm around the at least one hole has a curved profile.

* * * * *